United States Patent
Trainin et al.

(10) Patent No.: US 10,848,218 B2
(45) Date of Patent: Nov. 24, 2020

(54) FAST BEAM REFINEMENT PHASE FOR PERIODIC BEAMFORMING TRAINING

(71) Applicant: QUALCOMM Incorporated, San Diego, CA (US)

(72) Inventors: Solomon Trainin, Haifa (IL); Amichai Sanderovich, Atlit (IL); Assaf Yaakov Kasher, Haifa (IL); Alecsander Petru Eitan, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/884,890

(22) Filed: Jan. 31, 2018

(65) Prior Publication Data
US 2018/0227027 A1    Aug. 9, 2018

Related U.S. Application Data

(60) Provisional application No. 62/455,576, filed on Feb. 6, 2017.

(51) Int. Cl.
*H04B 7/06* (2006.01)
*H04B 7/08* (2006.01)
(Continued)

(52) U.S. Cl.
CPC .......... *H04B 7/0617* (2013.01); *H04B 7/063* (2013.01); *H04B 7/0695* (2013.01); *H04B 7/088* (2013.01); *H04W 72/046* (2013.01); *H04W 84/12* (2013.01)

(58) Field of Classification Search
CPC .. H04B 7/0413; H04B 7/0617; H04B 7/0456; H04B 7/0417; H04B 7/0639
See application file for complete search history.

(56) References Cited

U.S. PATENT DOCUMENTS 8,335,167 B1    12/2012  Zhang et al.
8,611,288 B1    12/2013  Zhang et al.
(Continued)

OTHER PUBLICATIONS

International Search Report and Written Opinion—PCT/US2018/016341—ISA/EPO—dated May 4, 2018.
(Continued)

*Primary Examiner* — Shuwang Liu
*Assistant Examiner* — Gina M McKie
(74) *Attorney, Agent, or Firm* — Patterson + Sheridan, L.L.P.

(57) ABSTRACT

Certain aspects of the present disclosure provide methods and apparatus for enhancing a beamforming training procedure. For example, an apparatus for wireless communications may include a processing system configured to generate a first transmit beamforming refinement frame, a first interface configured to output the first transmit beamforming refinement frame for transmission to a wireless node, wherein a first portion of the first transmit beamforming refinement frame is output for transmission via a first transmit beamforming sector and further wherein training fields of the first transmit beamforming refinement frame are output for transmission via two or more second transmit beamforming sectors, and a second interface configured to obtain a first feedback frame from the wireless node indicating one of the second transmit beamforming sectors. The apparatus may be configured to use the indicated second transmit beamforming sector for communication with the wireless node.

19 Claims, 9 Drawing Sheets

(51) Int. Cl.
*H04W 72/04* (2009.01)
*H04W 84/12* (2009.01)

(56) References Cited

U.S. PATENT DOCUMENTS

| | | | | |
|---|---|---|---|---|
| 2010/0150254 A1* | 6/2010 | Hansen | ................ | H04B 7/0617 375/259 |
| 2010/0215027 A1* | 8/2010 | Liu | ...................... | H04B 7/0695 370/338 |
| 2010/0265925 A1* | 10/2010 | Liu | ...................... | H04B 7/0617 370/336 |
| 2011/0064033 A1* | 3/2011 | Gong | ................... | H04B 7/0617 370/329 |
| 2015/0289147 A1 | 10/2015 | Lou et al. | | |
| 2016/0119043 A1* | 4/2016 | Rajagopal | .............. | H04B 7/063 370/329 |
| 2016/0323755 A1 | 11/2016 | Cordeiro et al. | | |
| 2017/0180025 A1* | 6/2017 | Cariou | ................ | H04B 7/0617 |
| 2017/0353984 A1* | 12/2017 | Abdallah | ............. | H04B 7/0617 |
| 2019/0036571 A1* | 1/2019 | Takeda | ................. | H04B 7/0404 |

OTHER PUBLICATIONS

"IEEE Standard for Information technology—Telecommunications and information exchange between systems—Local and Metropolitan Area Networks—Specific requirements—Part 11: Wireless LAN Medium Access Control (MAC) and Physical Layer (PHY) Specifications Amendment 3: Enhancements for Very High Through", Dec. 28, 2012, IEEE Standard, IEEE, Piscataway, NJ, USA, pp. 300-308, ISBN: 978-0-7381-8096-0.

* cited by examiner

FAST BEAM REFINEMENT PHASE FOR PERIODIC BEAMFORMING TRAINING

CLAIM OF PRIORITY UNDER 35 U.S.C. § 119

The present Application for Patent claims benefit of U.S. Provisional Patent Application Ser. No. 62/455,576, filed Feb. 6, 2017, assigned to the assignee hereof and hereby expressly incorporated by reference herein.

BACKGROUND

Field of the Disclosure

Certain aspects of the present disclosure generally relate to wireless communications and, more particularly, to enhancing beam refinement during a beamforming training procedure.

In order to address the issue of increasing bandwidth requirements demanded for wireless communications systems, different schemes are being developed to allow multiple user terminals to communicate with a single access point by sharing the channel resources while achieving high data throughputs.

Certain applications, such as virtual reality (VR) and augmented reality (AR) may demand data rates in the range of several Gigabits per second. Certain wireless communications standards, such as the Institute of Electrical and Electronics Engineers (IEEE) 802.11 standard. The IEEE 802.11 standard denotes a set of Wireless Local Area Network (WLAN) air interface standards developed by the IEEE 802.11 committee for short-range communications (e.g., tens of meters to a few hundred meters).

Amendment 802.11ad to the WLAN standard defines the MAC and PHY layers for very high throughput (VHT) in the 60 GHz range. Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, and the like, resulting in higher free space loss. The higher free space loss can be compensated for by using many small antennas, for example arranged in a phased array.

Using a phased array, multiple antennas may be coordinated to form a coherent beam traveling in a desired direction (or beam), referred to as beamforming. An electrical field may be rotated to change this direction. The resulting transmission is polarized based on the electrical field. A receiver may also include antennas which can adapt to match or adapt to changing transmission polarity.

The procedure to adapt the transmit and receive antennas, referred to as beamform training, may be performed initially to establish a link between devices and may also be performed periodically to maintain a quality link using the best transmit and receive beams.

Unfortunately, beamforming training represents a significant amount of overhead, as the training time reduces data throughput. The amount of training time increases as the number of transmit and receive antennas increase, resulting in more beams to evaluate during training.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide an apparatus for wireless communications. The apparatus generally includes a processing system configured to generate a first beamforming refinement frame, a first interface configured to output the first transmit beamforming refinement frame for transmission to a wireless node, wherein a first portion of the first transmit beamforming refinement frame is output for transmission via a first transmit beamforming sector and further wherein training fields of the first transmit beamforming refinement frame are output for transmission via two or more second transmit beamforming sectors, and a second interface configured to obtain a first feedback frame from the wireless node indicating one of the one or more second transmit beamforming sectors, wherein the apparatus is configured to use the indicated second transmit beamforming sector for communication with the wireless node.

Certain aspects of the present disclosure provide an apparatus for wireless communications. The apparatus generally includes a first interface configured to obtain a first transmit beamforming refinement frame from a wireless node, wherein a first portion of the first transmit beamforming refinement frame is obtained via a first receive beamforming sector and further wherein training fields of the first transmit beamforming refinement frame are obtained while the apparatus is in an omnidirectional receive antenna mode, a processing system configured to generate a first feedback frame indicating a first transmit beamforming sector that was used to transmit one of the training fields of the first transmit beamforming refinement frame, and a second interface configured to output the first feedback frame for transmission to the wireless node.

Aspects of the present disclosure also provide various methods, means, computer program products, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements described in one aspect may be beneficially utilized on other aspects without specific recitation.

DETAILED DESCRIPTION

Figure 1:
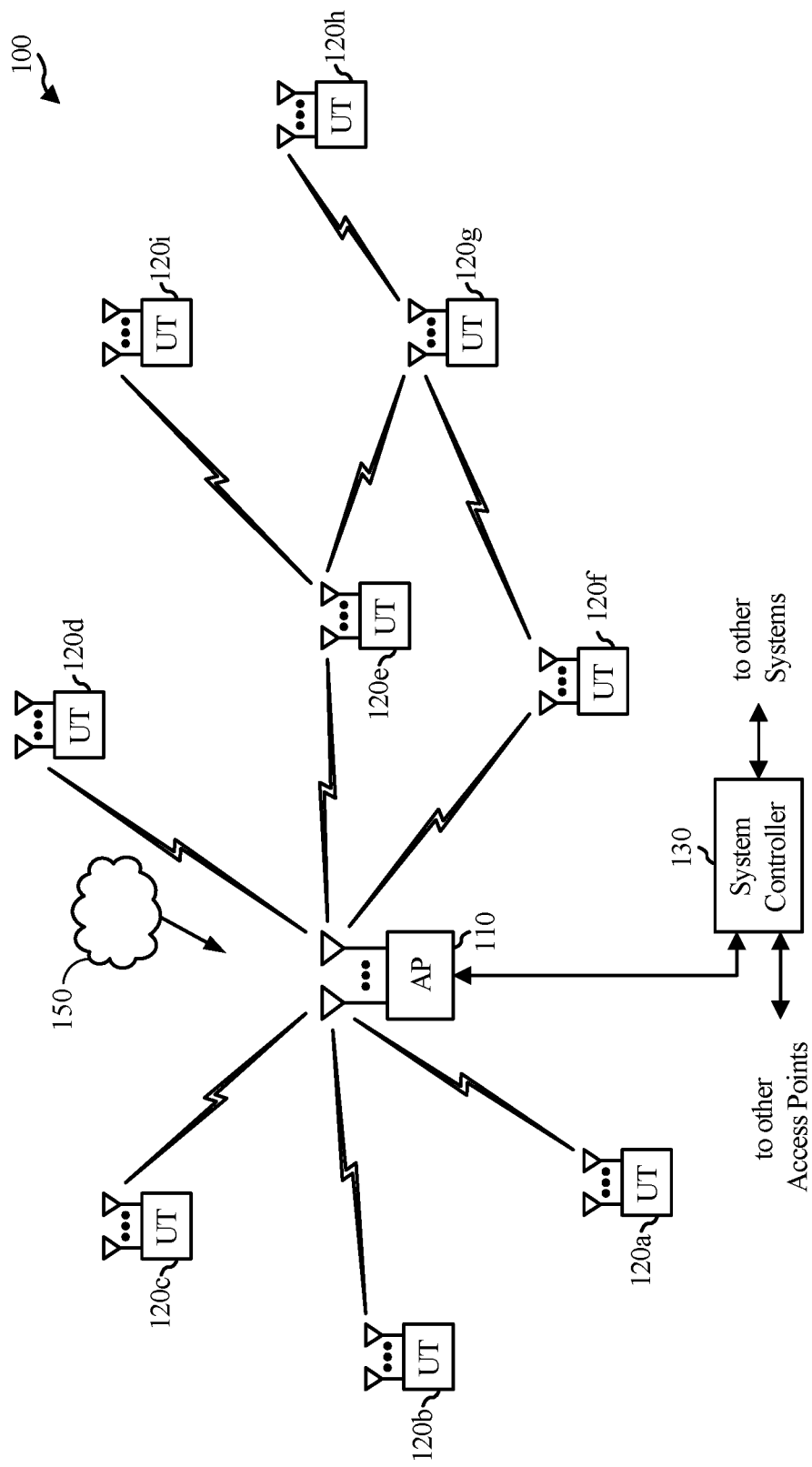
FIG. 1 is a diagram of an example wireless communications network, in accordance with certain aspects of the present disclosure.

Certain aspects of the present disclosure provide methods and apparatus for enhancing a beam refinement phase (BRP) of a beamforming training procedure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure described herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure described herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. The techniques described herein may be utilized in any type of applied to Single Carrier (SC) and SC-MIMO systems.

The teachings herein may be incorporated into (e.g., implemented within or performed by) a variety of wired or wireless apparatuses (e.g., nodes). In some aspects, a wireless node implemented in accordance with the teachings herein may comprise an access point or an access terminal.

An access point ("AP") may comprise, be implemented as, or known as a Node B, a Radio Network Controller ("RNC"), an evolved Node B (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), or some other terminology.

An access terminal ("AT") may comprise, be implemented as, or known as a subscriber station, a subscriber unit, a mobile station, a remote station, a wireless station, a remote terminal, a user terminal, a user agent, a user device, user equipment, a user station, or some other terminology. In some implementations, an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals. For simplicity, only one access point 110 is shown in FIG. 1. An access point is generally a fixed station that communicates with the user terminals and may also be referred to as a base station or some other terminology. A user terminal may be fixed or mobile and may also be referred to as a mobile station, a wireless device or some other terminology. Access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal may also communicate peer-to-peer with another user terminal. A system controller 130 couples to and provides coordination and control for the access points.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an access point (AP) 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

The system 100 employs multiple transmit and multiple receive antennas for data transmission on the downlink and uplink. The access point 110 is equipped with $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of subbands with OFDM, and so on. Each selected user terminal transmits user-specific data to and/or receives user-specific data from the access point. In general, each selected user terminal may be equipped with one or multiple antennas (i.e., $N_{ut} \geq 1$). The K selected user terminals can have the same or different number of antennas.

The system 100 may be a time division duplex (TDD) system or a frequency division duplex (FDD) system. For a TDD system, the downlink and uplink share the same frequency band. For an FDD system, the downlink and uplink use different frequency bands. MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
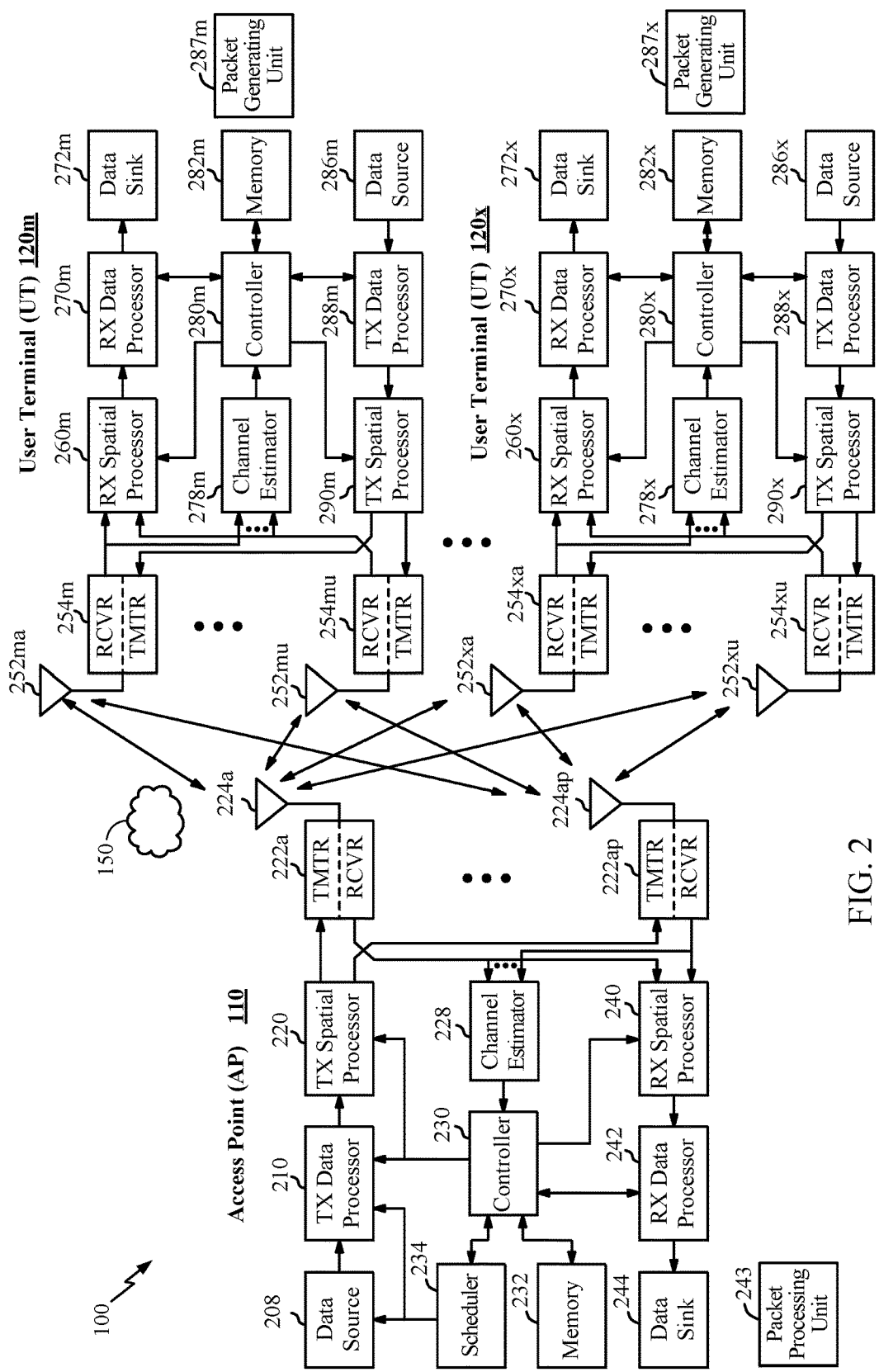
FIG. 2 is a block diagram of an example access point and example user terminals, in accordance with certain aspects of the present disclosure.

FIG. 2 illustrates a block diagram of access point 110 and two user terminals 120m and 120x in MIMO system 100. The access point 110 is equipped with $N_t$ antennas 224a through 224t. User terminal 120m is equipped with $N_{ut,m}$ antennas 252ma through 252mu, and user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. The term communication generally refers to transmitting, receiving, or both. In the following description, the subscript "dn" denotes the downlink, the subscript "up" denotes the uplink, Nup user terminals are selected for simultaneous transmission on the uplink, Ndn user terminals are selected for simultaneous transmission on the downlink, Nup may or may not be equal to Ndn, and Nup and Ndn may be static values or can change for each scheduling interval. The beam-steering or some other spatial processing technique may be used at the access point and user terminal.

On the uplink, at each user terminal 120 selected for uplink transmission, a TX data processor 288 receives traffic data from a data source 286 and control data from a controller 280. TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut,m}$ transmit symbol streams for the $N_{ut,m}$ antennas. Each transmitter unit (TMTR) 254 receives and processes (e.g., converts to analog, amplifies, filters, and frequency upconverts) a respective transmit symbol stream to generate an uplink signal. $N_{ut,m}$ transmitter units 254 provide $N_{ut,m}$ uplink signals for transmission from $N_{ut,m}$ antennas 252 to the access point.

At access point 110, $N_{ap}$ antennas 224a through 224ap receive the uplink signals. Each antenna 224 provides a received signal to a respective receiver unit (RCVR) 222. Each receiver unit 222 performs processing complementary to that performed by transmitter unit 254 and provides a received symbol stream. An RX spatial processor 240 performs receiver spatial processing on the $N_{ap}$ received symbol streams from $N_{ap}$ receiver units 222 and provides Nup recovered uplink data symbol streams. The receiver spatial processing is performed in accordance with minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for Ndn user terminals scheduled for downlink transmission, control data from a controller 230, and possibly other data from a scheduler 234. The various types of data may be sent on different transport channels. TX data processor 210 processes (e.g., encodes, interleaves, and modulates) the traffic data for each user terminal based on the rate selected for that user terminal. TX data processor 210 provides Ndn downlink data symbol streams for the Ndn user terminals. A TX spatial processor 220 performs spatial processing (such as a precoding or beamforming, as described in the present disclosure) on the Ndn downlink data symbol streams, and provides $N_{ap}$ transmit symbol streams for the $N_{ap}$ antennas. Each transmitter unit 222 receives and processes a respective transmit symbol stream to generate a downlink signal. $N_{ap}$ transmitter units 222 providing $N_{ap}$ downlink signals for transmission from $N_{ap}$ antennas 224 to the user terminals.

At each user terminal 120, $N_{ut,m}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut,m}$ received symbol streams from $N_{ut,m}$ receiver units 254 and provides a recovered downlink data symbol stream for the user terminal. The receiver spatial processing is performed in accordance with MMSE or some other technique. An RX data processor 270 processes (e.g., demodulates, deinterleaves and decodes) the recovered downlink data symbol stream to obtain decoded data for the user terminal.

At each user terminal 120, a channel estimator 278 estimates the downlink channel response and provides downlink channel estimates, which may include channel gain estimates, SNR estimates, noise variance and so on. Similarly, a channel estimator 228 estimates the uplink channel response and provides uplink channel estimates. Controller 280 for each user terminal typically derives the spatial filter matrix for the user terminal based on the downlink channel response matrix $H_{dn,m}$ for that user terminal. Controller 230 derives the spatial filter matrix for the access point based on the effective uplink channel response matrix $H_{up,eff}$. Controller 280 for each user terminal may send feedback information (e.g., the downlink and/or uplink eigenvectors, eigenvalues, SNR estimates, and so on) to the access point. Controllers 230 and 280 also control the operation of various processing units at access point 110 and user terminal 120, respectively.

As illustrated, in FIGS. 1 and 2, one or more user terminals 120 may send one or more packets 150 to the access point 110 as part of a UL MU-MIMO transmission, for example. Each packet 150 may be transmitted on a set of one or more spatial streams (e.g., up to 4).

The packet 150 may be generated by a packet generating unit 287 at the user terminal 120. The packet generating unit 287 may be implemented in the processing system of the user terminal 120, such as in the TX data processor 288, the controller 280, and/or the data source 286.

After UL transmission, the packet 150 may be processed (e.g., decoded and interpreted) by a packet processing unit 243 at the access point 110. The packet processing unit 243 may be implemented in the process system of the access point 110, such as in the RX spatial processor 240, the RX data processor 242, or the controller 230. The packet processing unit 243 may process received packets differently, based on the packet type (e.g., with which amendment to the IEEE 802.11 standard the received packet complies). For example, the packet processing unit 243 may process a packet 150 based on the IEEE 802.11 standard, but may interpret a legacy packet (e.g., a packet complying with IEEE 802.11a/b/g) in a different manner, according to the standards amendment associated therewith.

Certain standards, such as the IEEE 802.11ay standard currently in the development phase, extend wireless communications according to existing standards (e.g., the 802.11ad standard) into the 60 GHz band. Example features to be included in such standards include channel aggregation and Channel-Bonding (CB). In general, channel aggregation utilizes multiple channels that are kept separate, while channel bonding treats the bandwidth of multiple channels as a single (wideband) channel.

As described above, operations in the 60 GHz band may allow the use of smaller antennas as compared to lower frequencies. While radio waves around the 60 GHz band have relatively high atmospheric attenuation, the higher free space loss can be compensated for by using many small antennas, for example arranged in a phased array.

Using a phased array, multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

Figure 3:
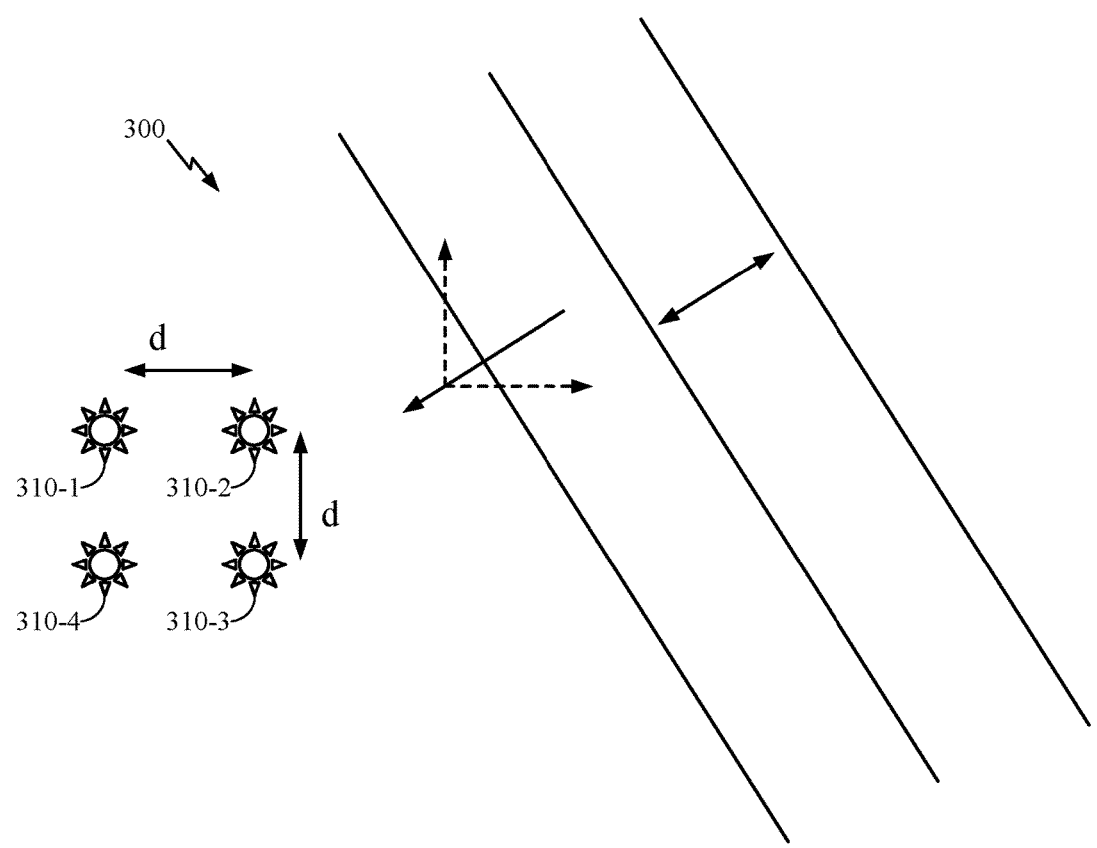
FIG. 3 is a diagram illustrating signal propagation in an implementation of phased-array antennas, in accordance with certain aspects of the present disclosure.

FIG. 3 is a diagram illustrating signal propagation 300 in an implementation of phased-array antennas. Phased array antennas use identical elements 310-1 through 310-4 (hereinafter referred to individually as an element 310 or collectively as elements 310). The direction in which the signal is propagated yields approximately identical gain for each element 310, while the phases of the elements 310 are different. Signals received by the elements are combined into a coherent beam with the correct gain in the desired direction.

Example Beamforming Training Procedure

In high frequency (e.g., mmWave) communication systems like 60 GHz (e.g., 802.11ad and 802.11ay), communication may be based on beamforming (BF), using phased arrays on both sides for achieving good link. As described above, beamforming (BF) generally refers to a mechanism used by a pair of STAs to adjust transmit and/or receive antenna settings to achieve a desired link budget for subsequent communication.

Figure 4:
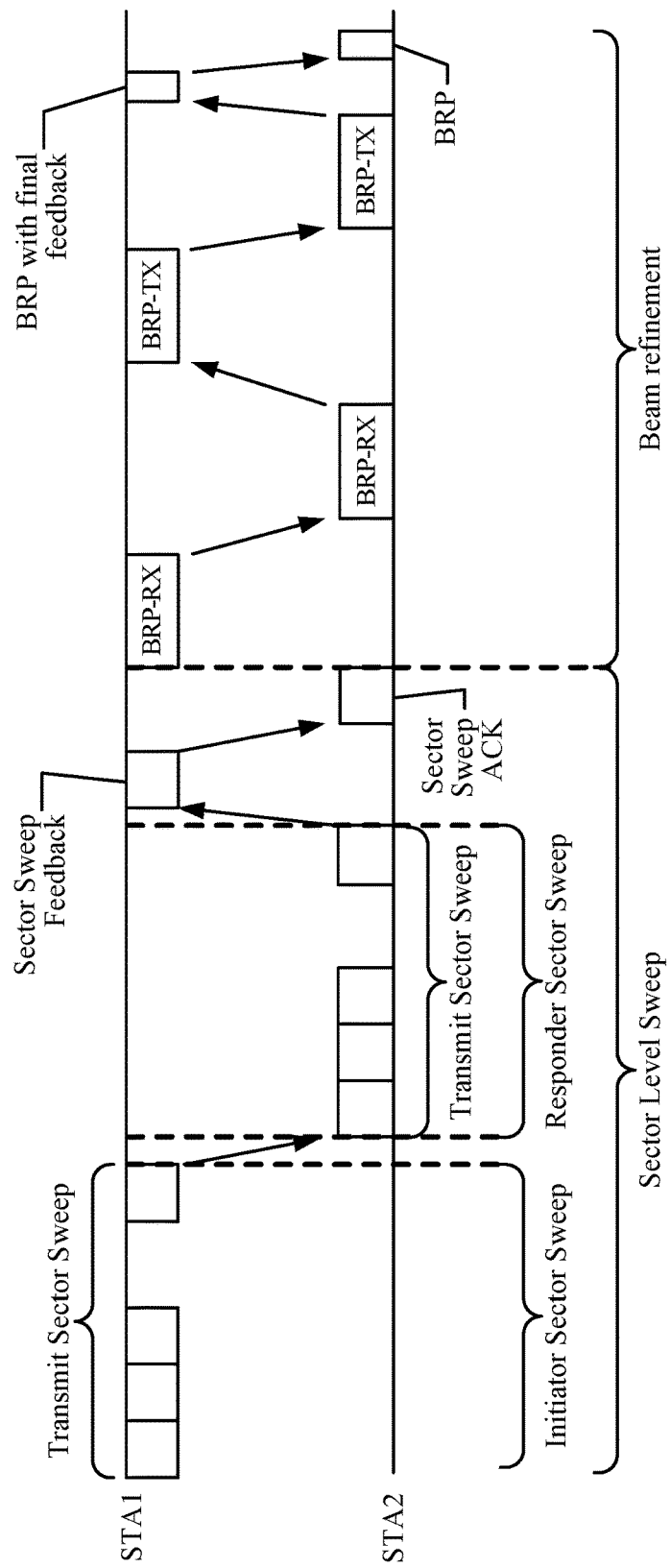
FIG. 4 illustrates an example beamforming training procedure.

As illustrated in FIG. 4, BF training typically involves a bidirectional sequence of BF training frame transmissions between stations (STA1 and STA2 in this example) that uses a sector sweep followed by a beam refining phase (BRP). For example, an AP or non-AP STA may initiate such a procedure to establish an initial link. During the sector sweep, each transmission may be sent using a different sector (covering a directional beam of a certain width)

identified in the frame and provides the necessary signaling to allow each STA to determine appropriate antenna system settings for both transmission and reception.

As illustrated in FIG. 4, in cases where the AP has large number of elements, the sectors used are relatively narrow, causing the SLS (Sector Level Sweep) process to be long. The higher the directivity, the more sectors that may be used, and therefore the SLS may be longer. As an example, an AP with an array of 100 antenna elements may use 100 sectors. This situation may not be desired because SLS is an overhead affecting throughput, power consumption and induces a gap in the transport flow.

Various techniques may be used to try and reduce throughput time. For example, short SSW (SSSW) messages may be used instead of the SSW messages, which may save some time (e.g., about 36%). In some cases, throughput may be reduced by utilizing the fact that in such APs the transmitter may transmit via several RF chains. This facilitates transmission in parallel on several single channels. It may shorten the scan by the factor number of frequencies (2, 3, or 4). However, this approach may involve the receiver supporting scans of the multiple frequencies, and the approach may not be backward compatible with, for example 802.11ad devices. Further, this approach may involve the stations being fully aware of this special mode in advance. In some cases, the Tx SLS+Rx SLS or the Tx SLS+Rx BRP may be replaced with a new Tx+Rx BRP where only one "very" long BRP message may be used with many TRN units. However, this method may involve a very long message but may be able to support multiple STAs in parallel, making the approach efficient for cases with a large number of STAs.

Example Fast Beam Refinement Phase for Beamforming Training

Certain aspects of the present disclosure provide methods and apparatus that may help enhance a beam refinement phase (BRP as shown in FIG. 4). For example, the techniques presented herein may help reduce time of the BRP during beamforming training which may be performed periodically to maintain high link quality which may be particularly important in certain applications.

For example, certain applications like Virtual Reality and Augmented Reality typically demand high gain beam links at each data transaction. Periodic beamforming at each link access may be used to meet this demand. However, these applications may be very sensitive to latency, such that it may be desirable to optimize the beam forming procedure in an effort to reduce training time while still providing bidirectional beamforming.

Aspects of the present disclosure may help enhance beamforming training by using a relatively short time duration of a BRP approach (that involves training fields in a single frame sent using different transmit beam sectors) to obtain a preferred sector instead of sector sweep (SSW) (that involves separate frames sent using different transmit beam sectors).

BRP may be implemented given that a link being established may be assumed and a high MCS may be used to deliver BRP frames. Aspects of the present disclosure may allow antenna configuration to change from old to new sector and from directed to omni-directional or quasi-omni directional in middle of the frame at start of training sequence thus shortening the overall frame length. As used herein, a receiver is considered in an omni-directional mode when an antenna array is not tuned for increased gain of signals transmitted from any particular direction. Quasi-omni refers to a practical approximation of an omni-directional mode (e.g., with negligible difference in gain in any particular direction of interest). In some cases, using SIFTS periods to perform some of the training processing during the training sequence may help relax BRP feedback time requirements by interleaving training of link directions.

Aspects of the present disclosure allow beam training to be performed with data sent over higher MCS (e.g., using an old/previously-established Tx sector), then the responder may switch to Omni-mode for the Tx training operation. As will be described in greater detail below, this switch may happen in the middle of BRP TX training on the RX side. Further, a switch may also occur in the middle of a BRP RX frame, with a switch from an old/previously-established Rx sector to a new Rx sector in the middle of BRP RX.

The fast BRP procedure described herein may reduce training time sufficiently to allow BRP to be performed more often. By reducing training overhead, the BRP procedure described herein may be performed without waiting for any significant deterioration of the link, which may result in the ability to maintain a best link for data transactions. This may be aided because MCS is high, such that beam forming training may be performed quickly and the stations already have configuration of Tx antennas and Rx antennas (e.g., based on previous training).

Figure 5:
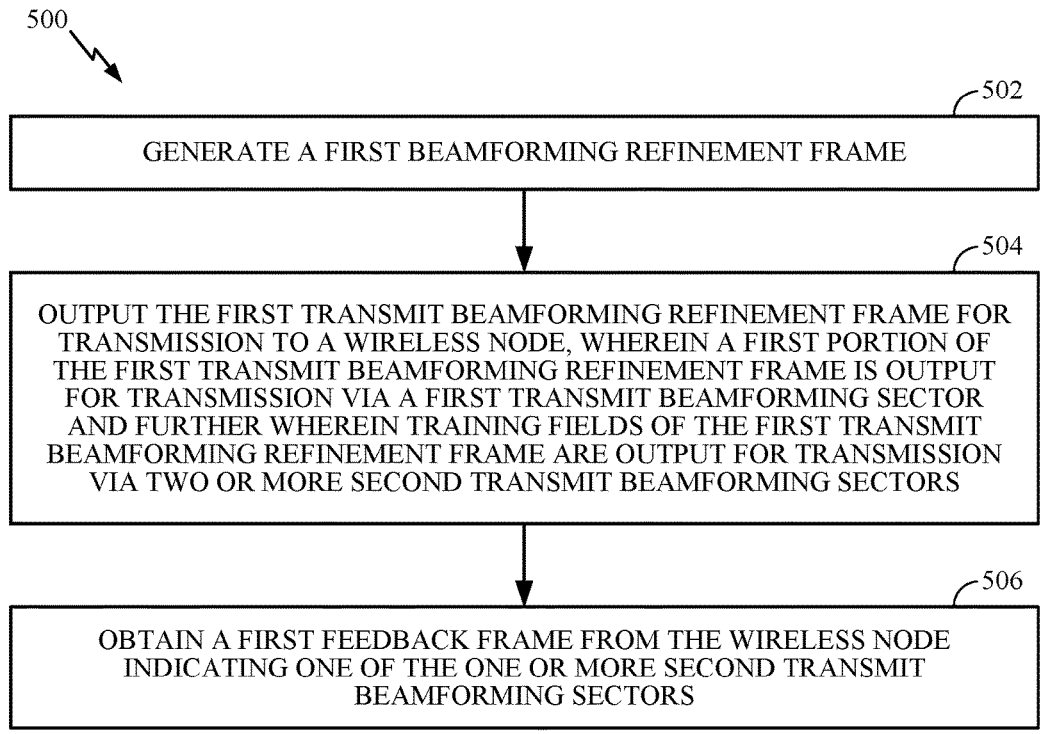
FIG. 5 illustrates example operations for performing transmit beamforming training by an initiator, in accordance with certain aspects of the present disclosure.
Figure 5A:
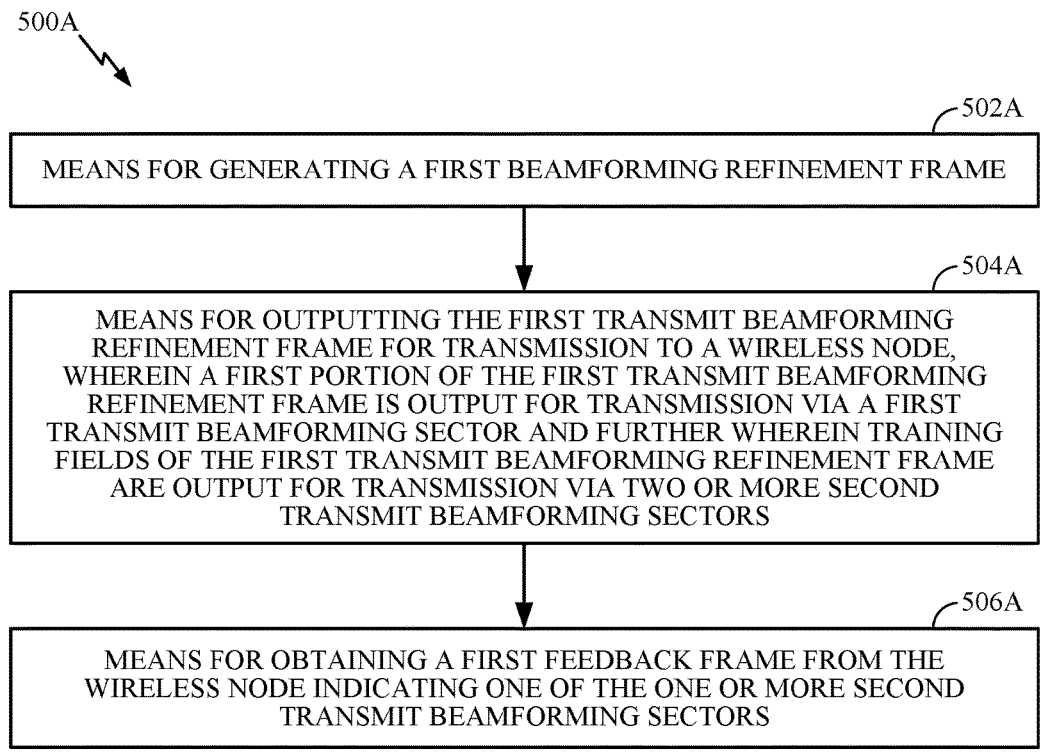
FIG. 5A illustrates example components capable of performing the operations shown in FIG. 5.
Figure 6:
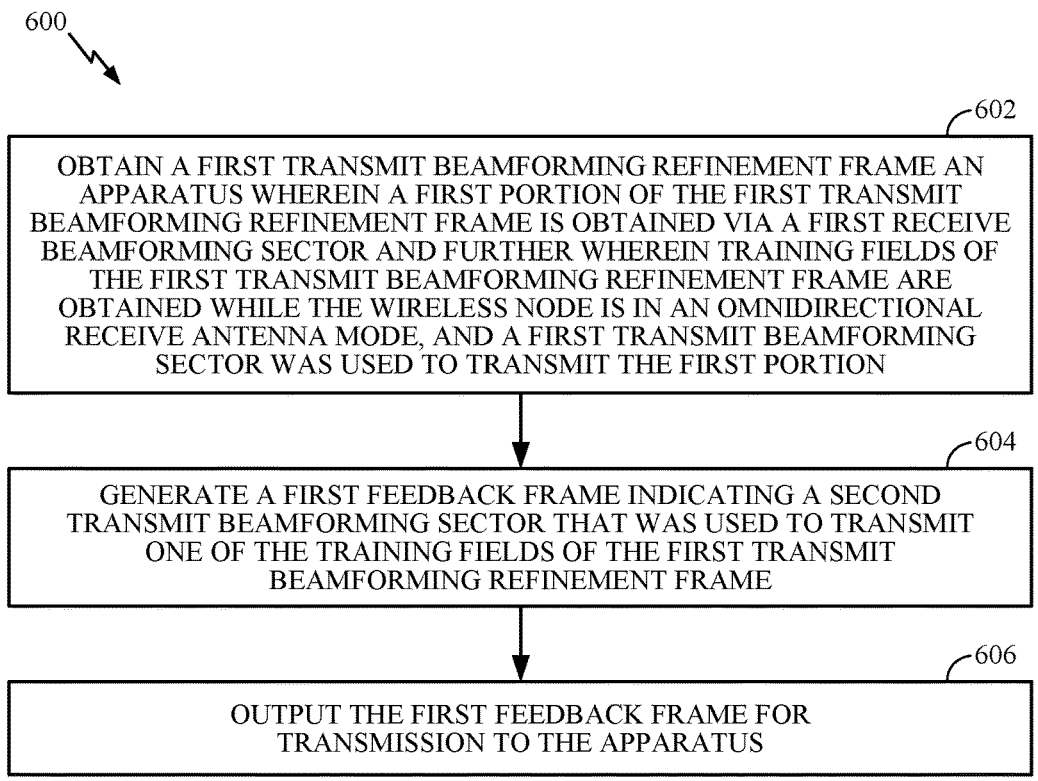
FIG. 6 illustrates example operations for performing transmit beamforming training by a responder, in accordance with certain aspects of the present disclosure.
Figure 6A:
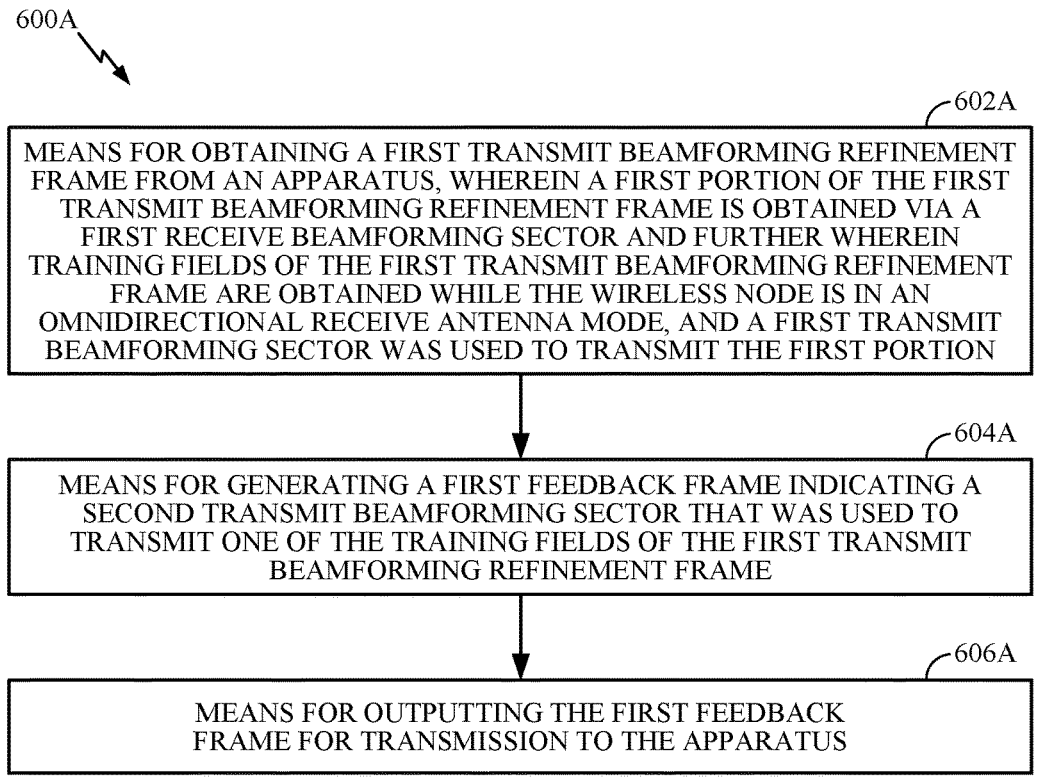
FIG. 6A illustrates example components capable of performing the operations shown in FIG. 6.
Figure 7:
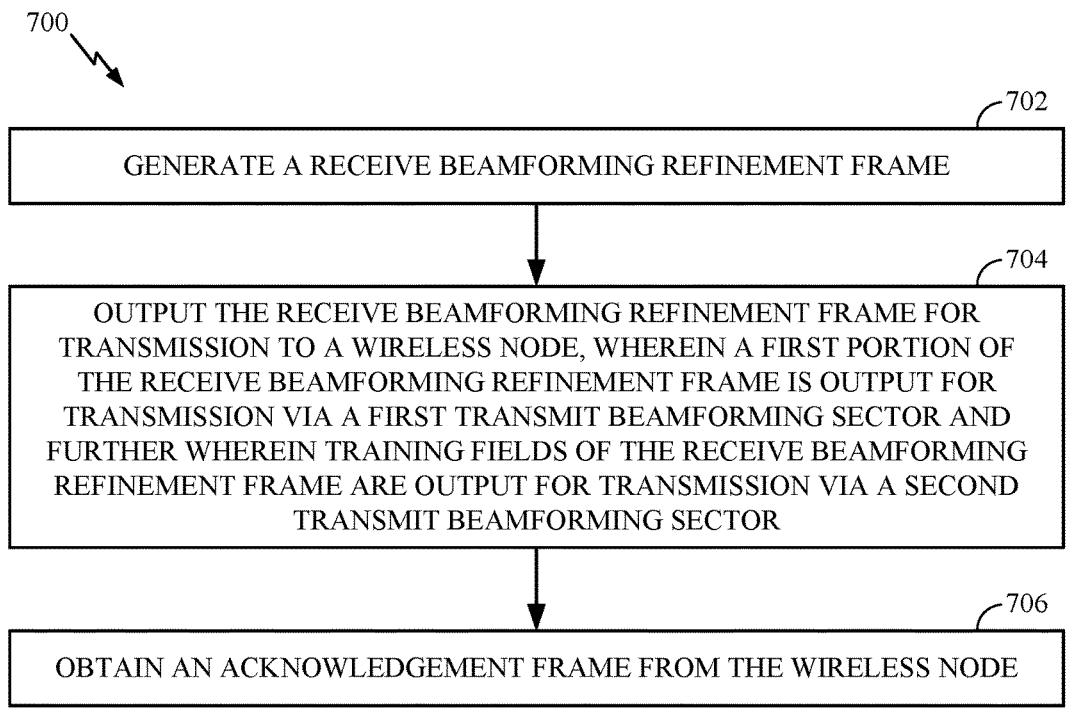
FIG. 7 illustrates example operations for performing receive beamforming training by an initiator, in accordance with certain aspects of the present disclosure.
Figure 7A:
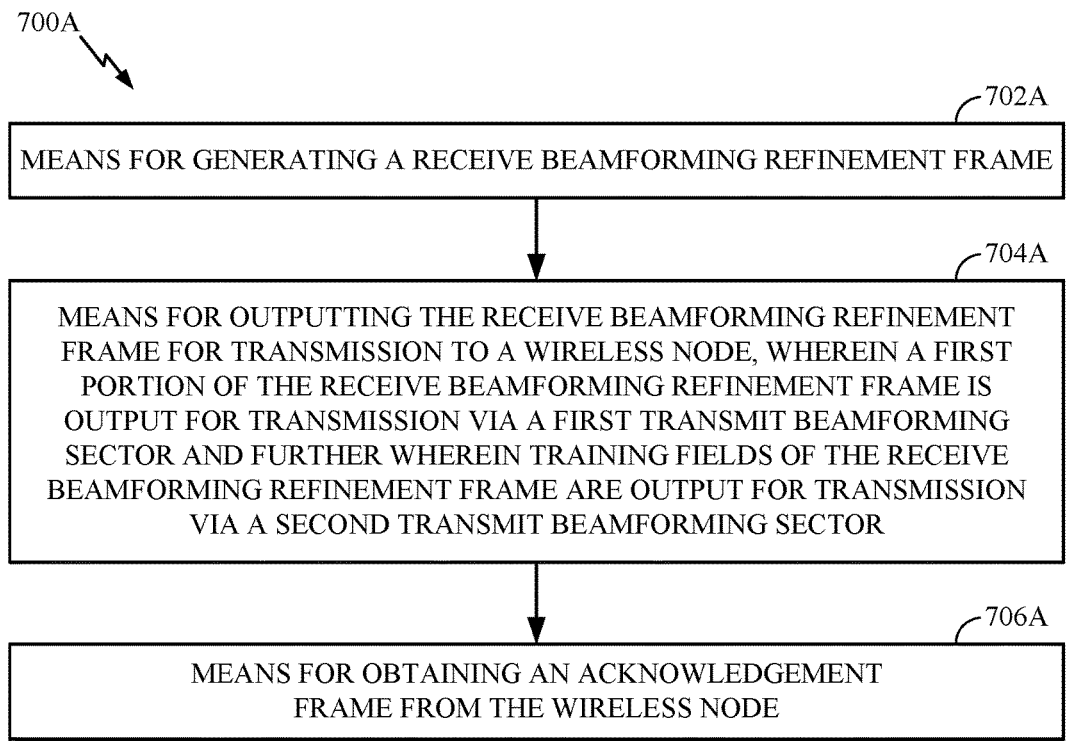
FIG. 7A illustrates example components capable of performing the operations shown in FIG. 7.
Figure 8:
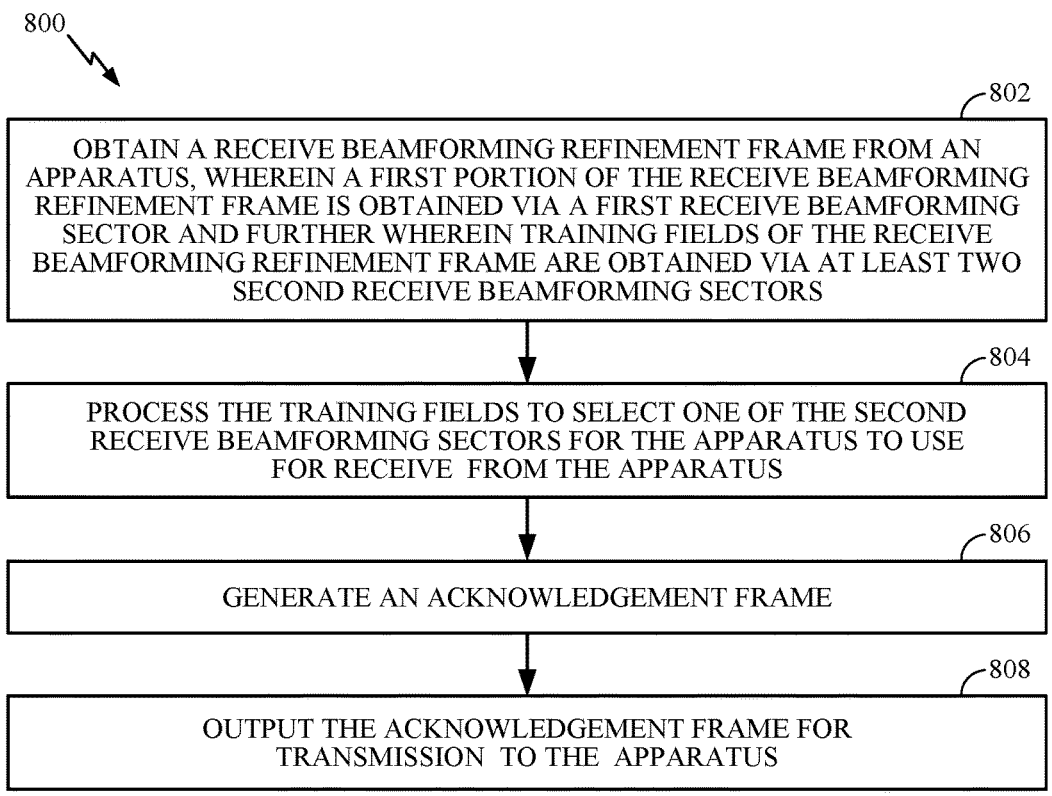
FIG. 8 illustrates example operations for performing receive beamforming training by a responder, in accordance with certain aspects of the present disclosure.
Figure 8A:
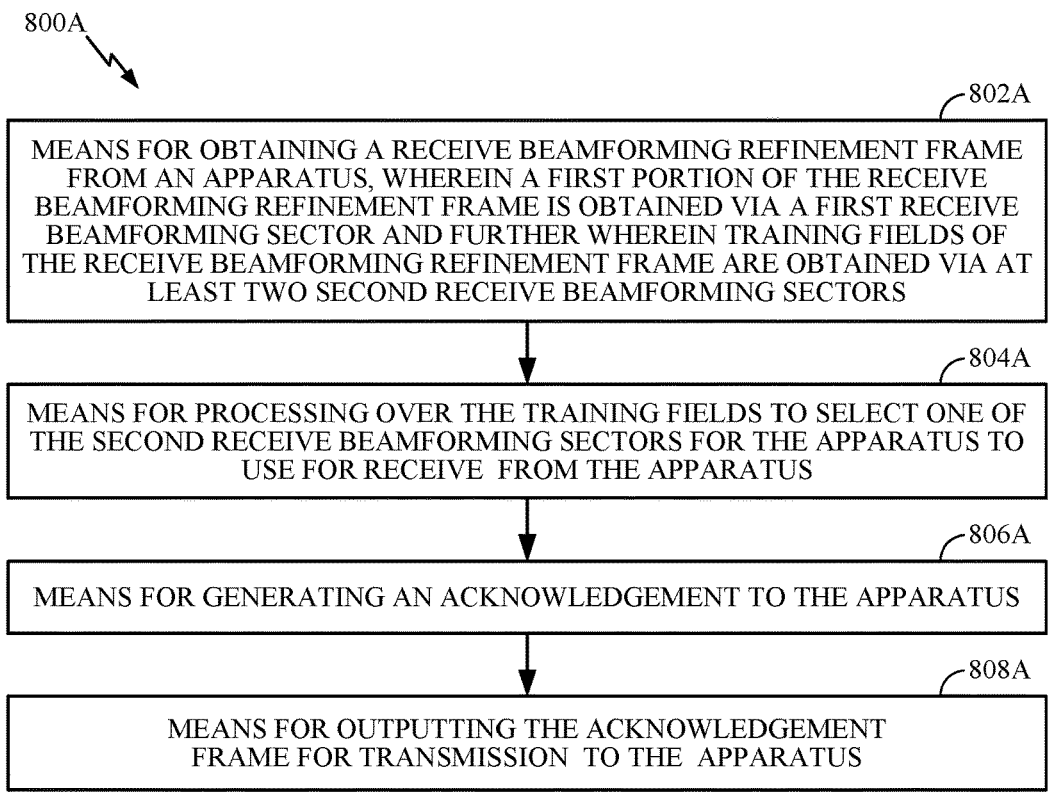
FIG. 8A illustrates example components capable of performing the operations shown in FIG. 8.

FIGS. 5-9 are flow diagrams that illustrate example operations for fast beam refinement, in accordance with aspects of the present disclosure. FIGS. 5 and 6 illustrate example operations for fast transmit beamforming training from an initiator and responder perspective, respectively. FIGS. 7 and 8 illustrate example operations for fast receive beamforming training from an initiator and responder perspective, respectively. As will be described below, in some cases both fast transmit beamforming training and fast receive beamforming training may be performed in a single transmit opportunity (TXOPS).

FIG. 5 illustrates example operations 500 for transmit beamforming training, in accordance with certain aspects of the present disclosure. The operations 500 may be performed by an initiator of the beamforming training, for example, by an AP or non-AP station (STA).

The operations 500 begin, at 502, by generating a first beamforming refinement frame. At 504, the first transmit beamforming refinement frame may be output for transmission to a wireless node, wherein a first portion of the first transmit beamforming refinement frame may be output for transmission via a first transmit beamforming sector and further wherein training fields of the first transmit beamforming refinement frame are output for transmission via two or more second transmit beamforming sectors. At 506, a first feedback frame may be obtained from the wireless node indicating one of the one or more second transmit beamforming sectors. The apparatus may be configured to use the indicated second transmit beamforming sector for transmission to the wireless node.

In one or more case, additional operations for transmit beamforming training may be provided. For example, a method at includes operations 500 may further include generating a first receive beamforming refinement frame, and outputting the first receive beamforming refinement frame for transmission to the wireless node, wherein a first portion of the first receive beamforming refinement frame is output for transmission via the first transmit beamforming sector and training fields of the first receive beamforming refinement frame are output for transmission using the indicated second transmit beamforming sector. Additionally, the method may include generating a request frame to reserve a medium for wireless communication between the apparatus and the wireless node during a time duration, and outputting the request frame for transmission via the medium. In some cases, the first transmit beamforming refinement frame and the first receive beamforming refinement frame are output for transmission via the medium during the time duration.

In some cases, a method for transmit beamforming training as described above may further include generating a second receive beamforming refinement frame for transmission to the wireless node during the time duration, if the apparatus does not obtain acknowledgement, from the wireless node, of the first receive beamforming refinement frame.

In some cases, a method for transmit beamforming training may further include obtaining a second transmit beamforming refinement frame, from the wireless node, wherein a first portion of the second transmit beamforming refinement frame is obtained using a first receive beamforming sector and training fields of the second transmit beamforming refinement frame are obtained while the apparatus is in an omnidirectional receive antenna mode. The method may further include selecting a third transmit beamforming sector based on the training fields of the second transmit beamforming refinement frame and to generate a second feedback frame indicating the third transmit beamforming sector. Further, the method may include outputting the second feedback frame for transmission.

In some cases, a method for transmit beamforming training may further include obtaining a second receive beamforming refinement frame, from the wireless node, wherein a first portion of the second receive beamforming refinement frame is obtained using the first receive beamforming sector and training fields of the second receive beamforming refinement frame are obtained using different second receive beamforming sectors. The method may further include generating a third feedback frame acknowledging receipt of the second receive beamforming refinement frame, and outputting the third feedback frame for transmission.

FIG. 6 illustrates example operations 600 for performing transmit beamforming training by a responder, for example, an AP or non-AP STA, in accordance with certain aspects of the present disclosure. Operations 600 may be considered complementary to operations 500. For example, operations 600 may be performed by the wireless node referenced in operations 500 and participating in a fast beamforming refinement procedure with the apparatus performing operations 500.

The operations 600 begin, at 602, by obtaining a first transmit beamforming refinement frame from the apparatus, wherein a first portion of the first transmit beamforming refinement frame may be obtained via a first receive beamforming sector and further wherein training fields of the first transmit beamforming refinement frame are obtained while the wireless node may be in an omnidirectional receive antenna mode, and a first transmit beamforming frame was used to transmit the first portion of the first transmit beamforming refinement frame. In some cases, an apparatus without actual antennas (such as a processor) may be considered in an omnidirectional receive antenna mode, for example, if the apparatus causes an RF/antenna module to switch to an omni-directional receive antenna mode. At 604, the wireless node generates a first feedback frame indicating a second transmit beamforming sector that was used to transmit one of the training fields of the first transmit beamforming refinement frame. At 606, the first feedback frame may be output for transmission to the apparatus.

In some cases, a method for transmit beamforming training may include additional operations. For example, a method may further include generating a second transmit beamforming refinement frame, and outputting for transmission the second transmit beamforming refinement frame, wherein a first portion of the second transmit beamforming refinement frame is output for transmission using a second transmit beamforming sector and training fields of the second transmit beamforming refinement frame are output for transmission using different transmit beamforming sectors. The method may further include obtaining a second feedback frame indicating a third transmit beamforming sector that was used to transmit one of the training fields of the second transmit beamforming refinement frame, and using the fourth transmit beamforming sector for beamformed transmissions.

In one or more cases, a method for transmit beamforming training may further include obtaining a request frame to reserve a medium for wireless communication between the apparatus and the wireless node during a time duration, and outputting for transmission, via the medium, a response frame acknowledging the request frame. Further, the first transmit beamforming refinement frame and first receive beamforming refinement frame may be obtained via the medium during a time duration.

FIG. 7 illustrates example operations 700 for receive beamforming training, in accordance with certain aspects of the present disclosure. The operations 700 may be performed by an initiator of the beamforming training, for example, by an AP or non-AP station (STA).

The operations 700 begin, at 702, by generate a receive beamforming refinement frame. At 704, the receive beamforming refinement frame for transmission to a wireless node, wherein a first portion of the receive beamforming refinement frame may be output for transmission via a first transmit beamforming sector and further wherein training fields of the receive beamforming refinement frame are output for transmission via a second transmit beamforming sector.

At 706, an acknowledgement frame may be obtained from the wireless node. The acknowledgement frame generally indicates success of the BRP procedure, in relation to the beam-formed link between transmitter of the apparatus and receiver of the wireless node. Given the acknowledgement, the apparatus may stop using the first transmit beamforming sector from this point.

FIG. 8 illustrates example operations 800 for performing receive beamforming training by a responder, for example, an AP or non-AP STA, in accordance with certain aspects of the present disclosure. Operations 800 may be considered complementary to operations 700. For example, operations 800 may be performed by the wireless node referenced in operations 700 and participating in fast beamforming refinement procedure with the apparatus performing operations 700.

The operations 800 begin, at 802, by obtaining a receive beamforming refinement frame from the apparatus, wherein a first portion of the receive beamforming refinement frame may be obtained via a first receive beamforming sector and further wherein training fields of the receive beamforming refinement frame are obtained via at least two second receive beamforming sectors. At 804, the wireless node processes over the training fields to select one of the second receive beamforming sectors for the wireless node to use for receive from the apparatus. At 806, the wireless node generates an acknowledgement frame. As noted above, the acknowledgement frame may indicate success of the receive beamforming refinement at the wireless node. At 808 the acknowledgement frame may be output for transmission to the apparatus. At this point, the wireless node may be configured with the second receive sector to receive from the apparatus.

Figure 9:
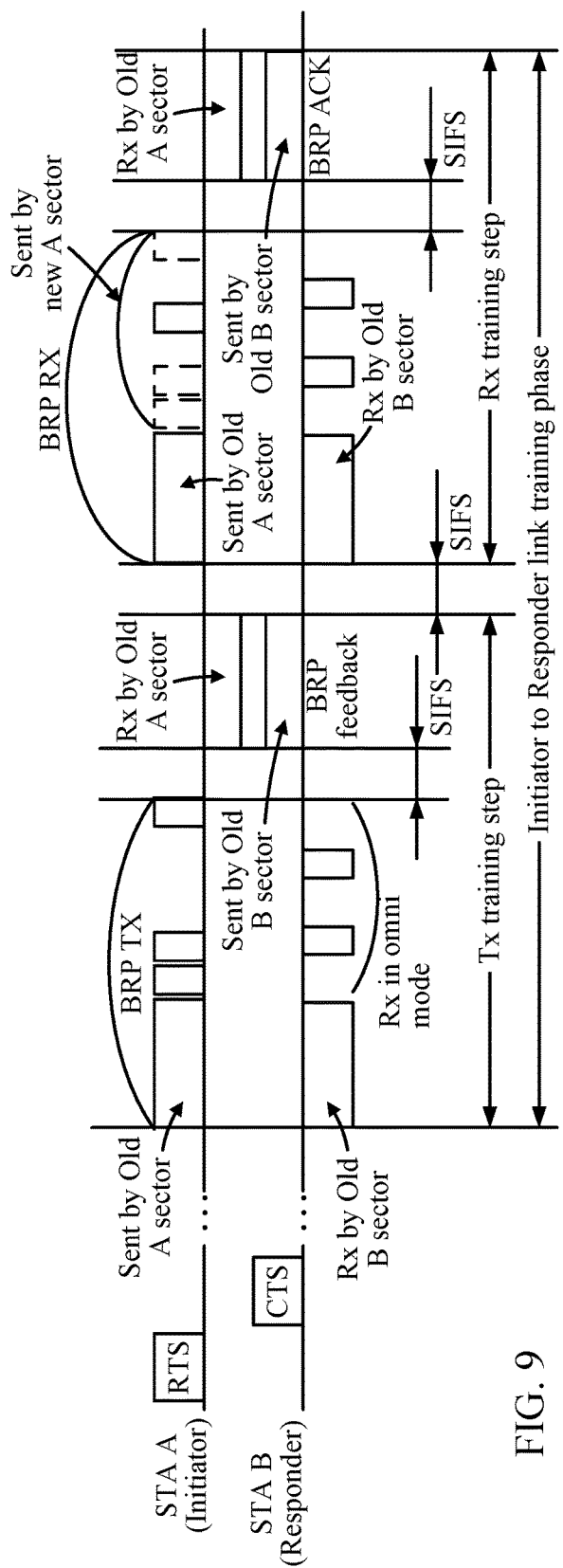
FIG. 9 illustrates an example of a beamforming refinement procedure, in accordance with certain aspects of the present disclosure.

FIG. 9 illustrates an example fast periodic BRP (FPB) process and phases, in accordance with aspects of the present disclosure. Such an FPB may be processed at any TXOPS or scheduled allocation in any place (e.g., at the start, in the middle, or at end). As illustrated, the TXOPS for performing the FPB may be achieved by regular link access, for example, using a request to send (RTS)/clear to send (CTS) handshaking, if applicable, and may not require any FPB specific preceding setup or scheduling.

At the time the initiator and responder exchange RTS/CTS handshake, any continuation of the TXOPS (achieved by the handshake) is possible. For example, the TXOPS may begin with a BRP or with an exchange of data traffic first. In general, the initiator may be free to proceed with any type of exchange, given that the techniques herein do not require the initiator to bring the responder to quasi-omni mode at start of the BRP frame, as is done in conventional BRP.

Referring to FIG. 9, the FRP starts with STA A (acting as the initiator) transmitting a BRP TX frame using the current sector (e.g., established from previous training), while the TRN fields of the frame are used to sweep between different Tx beamforming sectors. A STA B (acting as a responder) configures the Rx antennas to the current (best) Rx sector at completion of the RTS/CTS handshake, thus keeping immediate capability to get data frame or the BRP frame.

As illustrated, when getting the FPB/BRP Tx frame, the responding STA receives the MPDU part of the frame in directed mode and then switches the antenna to quasi-omni mode to be ready to get the TRNs of the BRP Tx frame.

As illustrated, the responding STA B responds with BRP feedback a SIFTS period after end of the BRP TX PPDU. The BRP feedback may comprise one or more sector IDs of the best transmit beamforming sectors (that STA A used for transmitting the TRN fields in the BRP-TX frame) and any other relevant information as well. This may be considered as completion of the FPB/BRP Tx operation. This operation may be repeated by the initiator, for example, in case the BRP feedback is not successfully delivered or results are not good enough.

At the end of the BRP TX operation, the initiating STA A may complete the A to B link training, if the initiation STA A assumes that no BRP Rx training may be required, by sending an acknowledgment (Ack) or BRP frame with relevant signaling to the responding STA B, thus allowing the STA B to initiate the "Responder to Initiator" training phase.

In case STA A starts the next operation, the BRP RX operation, STA A may start this a SIFTS time period after receiving the BRP feedback frame from STA B. At the next operation, the initiating STA A may proceed with BRP RX.

As illustrated, the STA A may use the old Tx beamforming sector for transmitting the MPDU part of the BRP Rx frame and then switch to a new Tx sector (or sectors), for example, that results from the BRP feedback when sending the BRP Rx trainings.

As shown, a responding STA B receives MPDU part of the BRP RX frame using the known Rx direction and then toggles the Rx sectors over training patterns of the BRP RX frame (e.g., while STA A transmits using a same Tx sector). At the end of this Rx training operation, the STA B may transmit a BRP Ack to STA A, indicating completion of the BRP Rx phase or the STA B may signal one more Rx training operations are desired. If no more Rx training is indicated, the initiator to responder link training may be considered competed.

A STA A may acknowledge the BRP Ack frame to initiate the next phase, which is the responder to initiator training phase. This phase is not shown in FIG. 9, but would be basically the same with STA A and STA B switching roles. According to certain aspects, the responding STA B may not continue with the responder to initiator training phase if no ACK frame is received. If the initiating STA A initiates the responder to initiator training phase, the STA B becomes role of the initiator and the STA A becomes the responder to proceed with the responder to initiator link training.

It may be challenging, during beamforming training, to process training fields and generate feedback fast enough to satisfy stringent latency requirements. Certain aspects of the present disclosure may provide for efficient processing by interleaving processing of one phase while performing another phase. For example, during bidirectional training of both A-B and B-A links, devices effectively using the training time (e.g., while transmitting) to process previously received training fields. Referring again to FIG. 9, STA B may use the time period of a BRP TX from STA B to STA A to process the training fields STA B received during a STA A to STA B BRP TX procedure. Thus, STA B may provide this feedback after the STA B to STA A BRP TX is complete.

Figure 10:
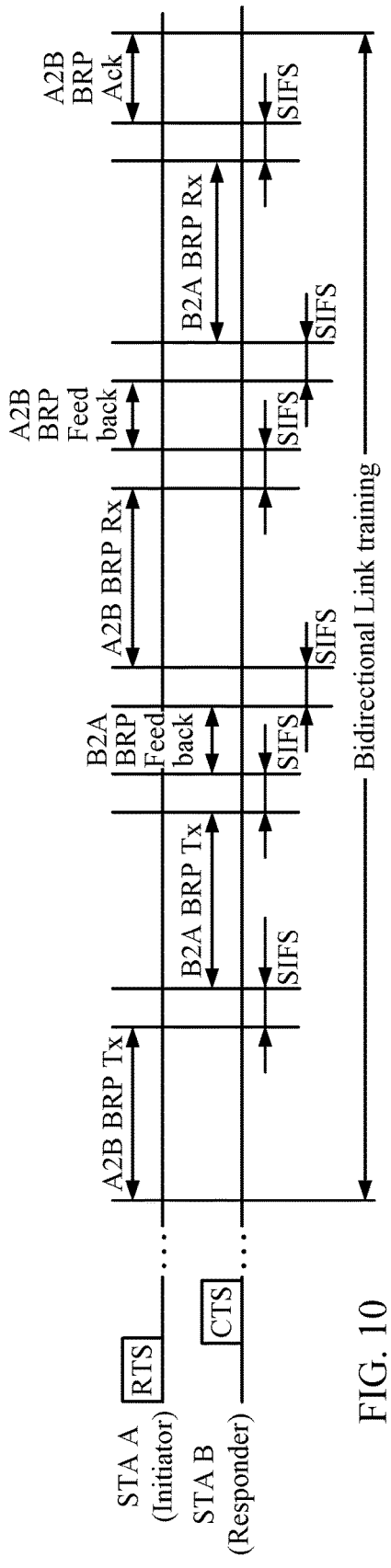
FIG. 10 illustrates an example of a beamforming refinement procedure, in accordance with certain aspects of the present disclosure.

This interleaved processing may be explained with reference to FIG. 10, which shows how, in a bidirectional approach, the operations of FPB may be interleaved to shorten the overall training time even more and also provide more time to calculate BRP feedback. As illustrated, the Initiator to responder BRP Tx operation may be followed by responder to initiator BRP Tx operation, which allows the responder STA B longer than the SIFTS time period to be ready with BRP feedback. The responder to initiator feedback may be followed with the initiator to responder BRP Rx phase, where the time of the BRP Rx may be used by the initiator STA to process and be ready with the BRP feedback to the responder. Each BRP Rx may be acknowledged with a BRP Ack (not shown in FIG. 10). All operations of initiator to responder and responder to initiator link training may be completed at end of the procedure.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 500, 600, 700, and 800 illustrated in FIGS. 5, 6, 7, and 8 correspond to means 500A, 600A, 700A, and 800A illustrated in FIGS. 5A, 6A, 7A and 8A.

For example, means for exchanging may comprise a transmitter (e.g., the transmitter unit 222) and/or an antenna(s) 224 of the access point 110 or the transmitter unit 254 and/or antenna(s) 252 of the user terminal 120 illustrated in FIG. 2 and/or a receiver (e.g., the receiver unit 222) and/or an antenna(s) 224 of the access point 110 or the receiver unit 254 and/or antenna(s) 254 of the user terminal 120 illustrated in FIG. 2. Means for causing, means for selecting, means for processing, means for using, or means for generating may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the user terminal 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as combinations that include multiples of one or more members (aa, bb, and/or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods described herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
a processing system configured to generate a first transmit beamforming refinement frame;
a first interface configured to output the first transmit beamforming refinement frame for transmission to a wireless node, wherein a first portion of the first transmit beamforming refinement frame is output for transmission via a first transmit beamforming sector and further wherein training fields of the first transmit beamforming refinement frame are output for transmission via two or more second transmit beamforming sectors; and
a second interface configured to obtain a first feedback frame from the wireless node indicating one of the second transmit beamforming sectors, wherein the apparatus is configured to use the indicated second transmit beamforming sector for communication with the wireless node;
wherein:
the second interface is further configured to obtain a second transmit beamforming refinement frame, from the wireless node, wherein a first portion of the second transmit beamforming refinement frame is obtained using a first receive beamforming sector and training fields of the second transmit beamforming refinement frame are obtained while the apparatus is in an omnidirectional receive antenna mode;
the processing system is configured to select a third transmit beamforming sector based on the training fields of the second transmit beamforming refinement frame and to generate a second feedback frame indicating the third transmit beamforming sector; and
the first interface is further configured to output the second feedback frame for transmission.

2. The apparatus of claim 1, wherein the first feedback frame is obtained after the second transmit beamforming refinement frame had been obtained.

3. The apparatus of claim 1, wherein:
the second interface is further configured to obtain a second receive beamforming refinement frame, from the wireless node, wherein a first portion of the second receive beamforming refinement frame is obtained using the first receive beamforming sector and training fields of the second receive beamforming refinement frame are obtained using different second receive beamforming sectors;
the processing system is configured to generate a second feedback frame acknowledging receipt of the second receive beamforming refinement frame; and
the first interface is further configured to output the second feedback frame for transmission.

4. The apparatus of claim 3, wherein the second feedback frame is output for transmission after the second receive beamforming refinement frame had been obtained.

5. An apparatus for wireless communications, comprising:
a processing system configured to generate a first transmit beamforming refinement frame;
a first interface configured to output the first transmit beamforming refinement frame for transmission to a wireless node, wherein a first portion of the first transmit beamforming refinement frame is output for transmission via a first transmit beamforming sector and further wherein training fields of the first transmit beamforming refinement frame are output for transmission via two or more second transmit beamforming sectors; and
a second interface configured to obtain a first feedback frame from the wireless node indicating one of the second transmit beamforming sectors, wherein the apparatus is configured to use the indicated second transmit beamforming sector for communication with the wireless node;
wherein:
the processing system is further configured to generate a first receive beamforming refinement frame; and
the first interface is further configured to output the first receive beamforming refinement frame for transmission to the wireless node, wherein a first portion of the first receive beamforming refinement frame is output for transmission via the first transmit beamforming sector and training fields of the first receive beamforming refinement frame are output for transmission using the indicated second transmit beamforming sector.

6. The apparatus of claim 5, wherein:
the processing system is further configured to generate a request frame to reserve a medium for wireless communication between the apparatus and the wireless node during a time duration;
the first interface is further configured to output the request frame for transmission via the medium; and
the first transmit beamforming refinement frame and the first receive beamforming refinement frame are output for transmission via the medium during the time duration.

7. The apparatus of claim 5, wherein:
the processing system is further configured to generate a second receive beamforming refinement frame for transmission to the wireless node, if the apparatus does not obtain acknowledgement, from the wireless node, of the first receive beamforming refinement frame.

8. An apparatus for wireless communications, comprising:
a first interface configured to obtain a first transmit beamforming refinement frame from a wireless node, wherein:
a first portion of the first transmit beamforming refinement frame is obtained via a first receive beamforming sector, and
training fields of the first transmit beamforming refinement frame are obtained while the apparatus is in an omnidirectional receive antenna mode;
a processing system configured to select a first transmit beamforming sector that was used to transmit one of the training fields, based on received signal quality of the one of the training fields, and to generate a first feedback frame indicating the first transmit beamforming sector; and
a second interface configured to output the first feedback frame for transmission to the wireless node.

9. The apparatus of claim 8, wherein:
the first interface is further configured to obtain a first receive beamforming refinement frame;
a first portion of the first receive beamforming refinement frame is obtained using the first receive beamforming sector;
training fields of the first receive beamforming refinement frame are obtained using different second receive beamforming sectors; and
the processing system is configured to process the training fields to select one of the different second receive beamforming sectors for the apparatus to use for communication with the wireless node.

10. The apparatus of claim 9, wherein:
the first interface is further configured to obtain a request frame to reserve a medium for wireless communication between the apparatus and the wireless node during a time duration;
the processing system is further configured to generate a response frame acknowledging the request frame;
the second interface is further configured to output the response frame for transmission, via the medium; and
the first transmit beamforming refinement frame and first receive beamforming refinement frame are obtained via the medium during the time duration.

11. The apparatus of claim 8, wherein:
the processing system is configured to generate a second transmit beamforming refinement frame;
the second interface is further configured to output for transmission the second transmit beamforming refinement frame, wherein a first portion of the second transmit beamforming refinement frame is output for transmission using a second transmit beamforming sector and training fields of the second transmit beamforming refinement frame are output for transmission using different transmit beamforming sectors;
the first interface is configured to obtain a second feedback frame indicating a third transmit beamforming sector that was used to transmit one of the training fields of the second transmit beamforming refinement frame; and
the apparatus is configured to use the third transmit beamforming sector for beamformed transmissions.

12. The apparatus of claim 11, wherein the first feedback frame is output for transmission after the second transmit beamforming refinement frame is output for transmission.

13. The apparatus of claim 11, wherein:
the processing system is configured to generate a second receive beamforming refinement frame;
the first interface is further configured to output the second receive beamforming refinement frame for transmission, wherein a first portion of the second receive beamforming refinement frame is output for transmission using the second transmit beamforming sector and training fields of the second receive beamforming refinement frame are output for transmission using the third transmit beamforming sector;

the processing system is configured to generate a third feedback frame acknowledging receipt of the second receive beamforming refinement frame; and the first interface is further configured to output the third feedback frame for transmission.

14. The apparatus of claim 13, wherein the second feedback frame is obtained after the second receive beamforming refinement frame is output for transmission.

15. An apparatus for wireless communications, comprising:
a processing system configured to generate a receive beamforming refinement frame; and
a first interface configured to output the receive beamforming refinement frame for transmission to a wireless node, wherein:
  a first portion of the receive beamforming refinement frame is output for transmission via a first transmit beamforming sector, and
  training fields of the receive beamforming refinement frame are output for transmission via a second transmit beamforming sector;
a second interface configured to obtain an acknowledgement frame from the wireless node indicating success of a beamforming refinement procedure, wherein the processing system is further configured to cause the apparatus to stop using the first transmit beamforming sector after receiving the acknowledgement frame.

16. An apparatus for wireless communications, comprising:
a processing system configured to generate a receive beamforming refinement frame; and
a first interface configured to output the receive beamforming refinement frame for transmission to a wireless node, wherein:
  a first portion of the receive beamforming refinement frame is output for transmission via a first transmit beamforming sector, and
  training fields of the receive beamforming refinement frame are output for transmission via a second transmit beamforming sector; and
a second interface configured to obtain a feedback frame from the wireless node indicating the second transmit beamforming sector, wherein:
  the processing system is configured to generate a transmit beamforming refinement frame;
  the first interface is further configured to output the transmit beamforming refinement frame for transmission to the wireless node, wherein a first portion of the transmit beamforming refinement frame is output for transmission via the first transmit beamforming sector and further wherein training fields of the transmit beamforming refinement frame are output for transmission via at least two transmit beamforming sectors including the second transmit beamforming sector; and
  the feedback frame is obtained after outputting the transmit beamforming refinement frame for transmission to the wireless node.

17. An apparatus for wireless communications, comprising:
a first interface configured to obtain a receive beamforming refinement frame from a wireless node, wherein a first portion of the receive beamforming refinement frame is obtained via a first receive beamforming sector and further wherein training fields of the receive beamforming refinement frame are obtained via at least two second receive beamforming sectors;
a processing system configured to:
  process the training fields to select one of the second receive beamforming sectors for the apparatus to use for communication with the wireless node; and
  generate an acknowledgement frame indicating success of a beamforming refinement procedure; and
a second interface configured to output the acknowledgment frame for transmission to the wireless node.

18. An apparatus for wireless communications, comprising:
a first interface configured to obtain a receive beamforming refinement frame from a wireless node, wherein a first portion of the receive beamforming refinement frame is obtained via a first receive beamforming sector and further wherein training fields of the receive beamforming refinement frame are obtained via at least two second receive beamforming sectors;
a processing system configured to:
  process the training fields to select one of the second receive beamforming sectors for the apparatus to use for communication with the wireless node; and
generate a feedback frame indicating a transmit beamforming sector for the wireless node to use for transmission of the training fields of the receive beamforming refinement frame;
and a second interface configured to output the feedback frame for transmission to the wireless node.

19. The apparatus of claim 18, wherein:
the first interface is further configured to obtain a transmit beamforming refinement frame from the wireless node, wherein a first portion of the transmit beamforming refinement frame is obtained via the first receive beamforming sector and further wherein training fields of the transmit beamforming refinement frame are obtained while the apparatus is in an omnidirectional receive antenna mode; and
the transmit beamforming sector indicated in the feedback frame comprises a transmit beamforming sector that was used to transmit one of the training fields of the transmit beamforming refinement frame.

* * * * *